United States Patent [19]

Bentley et al.

[11] Patent Number: 4,890,898

[45] Date of Patent: Jan. 2, 1990

[54] COMPOSITE MICROSIZE OPTICAL FIBER-ELECTRIC LEAD CABLE

[75] Inventors: Joseph R. Bentley, Holiday, Utah; Steven W. Kovalcheck, San Diego, Calif.

[73] Assignee: HGM Medical Laser Systems, Inc., Salt Lake City, Utah

[21] Appl. No.: 233,478

[22] Filed: Aug. 18, 1988

[51] Int. Cl.$^4$ .................................................. G02B 6/44
[52] U.S. Cl. ................................. 350/96.23; 128/736; 606/15; 606/16
[58] Field of Search ........................... 350/96.23, 96.26; 128/303.1, 397, 398, 4, 6

[56] References Cited

U.S. PATENT DOCUMENTS

| | | | |
|---|---|---|---|
| 4,185,887 | 1/1980 | Ferrentino | 350/96.23 |
| 4,325,606 | 4/1982 | Ikuno et al. | 350/96.26 X |
| 4,662,368 | 5/1987 | Hussein et al. | 128/303.1 |
| 4,773,413 | 9/1988 | Hussein et al. | 128/303.1 |

Primary Examiner—John D. Lee
Assistant Examiner—Phan T. Heartney
Attorney, Agent, or Firm—Olive & Olive

[57] ABSTRACT

A composite microsize cable construction comprises a microsize optical fiber for transferring laser energy to a site, a pair of microsize electrical leads for transferring temperature sensing or other signals from the site and a casing material of microsize diameter extruded over the optical fiber and electrical leads and positioning the electrical leads in a parallel non-overlapping relationship.

23 Claims, 3 Drawing Sheets

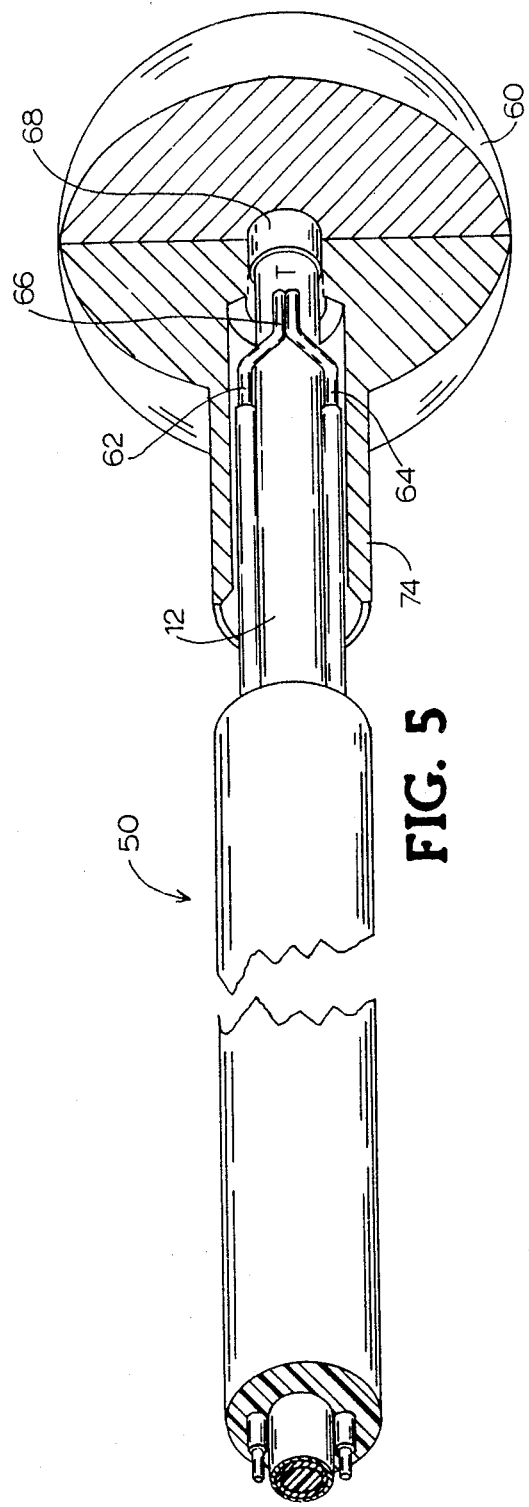
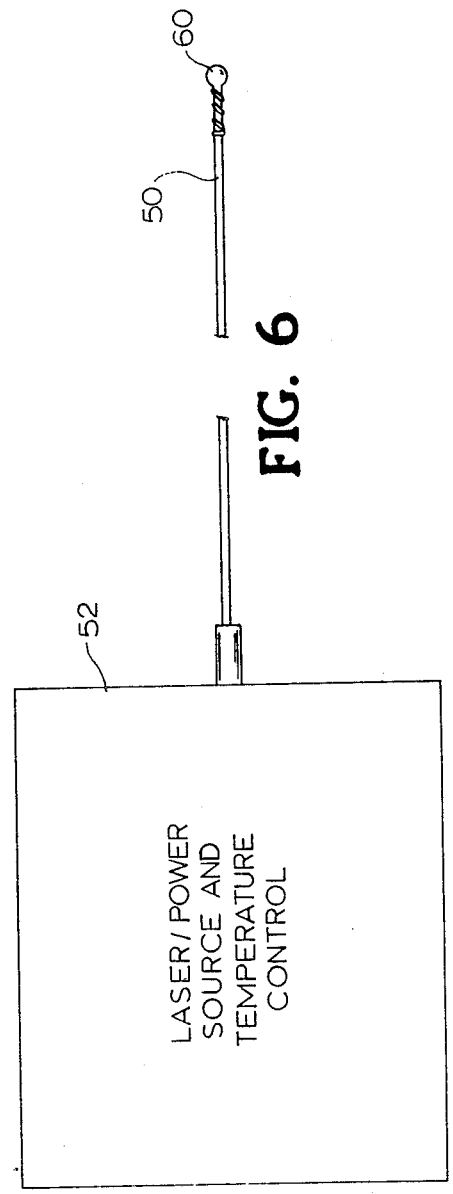

COMPOSITE MICROSIZE OPTICAL FIBER-ELECTRIC LEAD CABLE

BACKGROUND OF THE INVENTION

1. Field of the Invention

The present invention relates to a composite microsize cable construction having as one element an optical fiber for transferring laser energy and as another element, a pair of electrical leads for transferring temperature sensing signals.

2, Related Applications

This application relates to application Ser. No. 003,209, filed Jan. 14, 1987, entitled "Laser Angioplasty Probe", now U.S. Pat. No. 4,760,845 and application Ser. No. 180,188 filed Apr. 11, 1988 entitled "Laser Heated Probe and Control System".

3. Description of the Related Art

An extensive review of related prior art is given in the referred to copending related applications. Such review is incorporated here by referene and is repeated here only as necessary for background to the present invention.

A relatively recent medical procedure in laser angioplasty is that of indirect laser irradiation. In this procedure, laser energy is transmitted by a microsize e.g 300 microns, optical fiber at a power level of a few watts, e.g. one to sixteen or more watts, to a site to be treated such as an arterial or venous channel blocked by plaque At the site, the laser energy is converted to thermal energy by use of a thermally conductive device which is brought in contact with the plaque, thrombic complex or the like to melt or evaporate the channel blocking material.

The Federal Republic of Germany Pat. No. 2,826,383 published Dec. 20, 1979 is cited along with other references in U.S. Pat. No. 4,646,737 and 4,662,368. The earlier German patent as well as the two later U.S. patents disclose a heat generating element in the form of a metal probe mounted on an optical fiber through which light is transmitted to generate heat energy in the heat generating element. The German patent mentions but does not describe or illustrate use of a thermocouple and does not disclose means for controlling the temperature of the heat generating element.

U.S. Pat. No. 4,476,512 illustrates a system which is apparently directed to the direct laser irradiation technique since the patent makes no disclosure of using light energy to heat a probe or the like. This patent nevertheless illustrates a heat sensitive element, i.e. a thermistor, positioned on the surface of the output end of an optical fiber as a means of sensing abnormal changes in the surface temperature of the fiber at its output end. The lead from the temperature sensor is not described as to its composition and is illustrated as being a separate element from the cable which carries the optical fiber.

The substantially different characteristics of optical fibers and electrical leads and substantially different requirements for laser energy and temperature sensing signal transmissions within the body have apparently deterred prior attempts to provide a composite microsize cable in which both an optical microsize fiber of appropriate character and microsize temperature sensor leads of appropriate character have been formed into a common cable construction of microsize and suited to use in an angioplasty procedure. Thus, the primary object of the invention becomes that of providing such a cable. Other objects will become apparent as the description proceeds.

SUMMARY OF THE INVENTION

A microsize composite cable according to the invention comprises a construction in which a microsize, e.g. 200-600 microns, optical fiber capable of carrying sufficient laser energy to heat a probe for destroying plaque or the like and a pair of insulated microsize, e.g. 0.076 millimeters, leads capable of carrying a temperature sensing signal from the probe to a suitable control are both incorporated in a common microsize cable structure typically having an overall diameter of less than 1000 microns. Such cable when fitted at one end with a thermocouple or other temperature sensor and a suitable microsize probe typically of less than 5 millimeters in diameter readily adapts to being fed into and to bend sufficiently to accommodate to the curature of an arterial or venous channel and thus represents a significant advance in the art. The construction employed preserves structural integrity and flexibility in the composite cable as well as the desired optical character.

BRIEF DESCRIPTION OF THE DRAWINGS

FIG. 5 is a perspective cut-away view illustrating the invention cable mounting a laser heated vascular probe.

FIG. 6 is a schematic diagram of an overall laser heated vascular probe system utilizing the invention cable.

DETAILED DESCRIPTION OF THE INVENTION

Four embodiments of the invention are illustrated by way of example all of which are characterized by the provision of a microsize composite cable of limited flexibility having a centrally located optical fiber element and a pair of thermocouple wire leads running alongsidethe optical fiber element and a casing material extruded over and surrounding both the optical fiber element and the thermocouple leads and substantially fixedly positioning the optical fiber element and thermocouple leads with respect to each other with the cable.

While applicable to microsize wire leads other than microsize thermocouple leads, the description uses thermocouple leads as an immediate and readily understood example. From this description, those skilled in the art will readily appreciate how the microsize composite optical fiber cable of the invention could be employed with other types of microsize leads for carrying electrical signals or currents for other purposes in which such a cable is useful. In the various embodiments to be described the optical fiber diameter will typically be in the range of 200-600 microns and the optical fiber will typically have a bend radius of about 2 centimeters.

Figure 1:
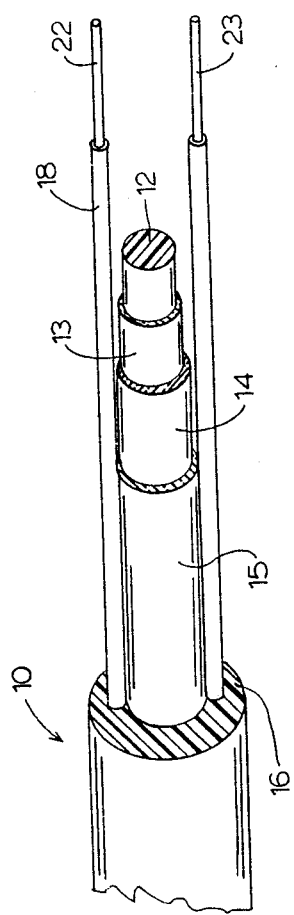
FIG. 1 is a perspective view of a composite microsize optical fiber and thermocouple lead cable according to the invention with portions removed so as to expose other portions for purposes of illustration according to a first embodiment.

Making reference to FIG. 1 there is illustrated a composite optical and thermocouple lead conducter cable 10 with a high optical grade quartz fiber core 12. A step index optical fiber core is the most typical for the invention recognizing that a graded index optical fiber core may be suited to some applications. It is also recognized that in some applications, e.g. an application involving low temperature and low cost, an acrylic fiber core may be used in place of the described quartz core 12.

The quartz fiber core 12 has a doped thin, e.g. 20 micron thickness, quartz clad 13 of greater numerical aperture than that of the quartz core 12. The doped quartz clad 13 is coated with a thin, e.g. 20 micron thickness, non-optical, high density, hard coating or buffer 14 to complete the basic optical fiber unit comprising quartz core 12, clad 13 and coating or buffer 14. The high density hard coating or buffer 14 gives mechanical support to the rigid core/clad thereby increasing the bendability of the fiber and also provides a protective barrier. Plastic polymers such as those comprising the HCS fiber line made by Ensign Bickford Optics Company of Avon, Conn. or a thermoplastic such as a polyimide are suitable for such coating or buffer.

The basic optical fiber unit comprising the core 12, the clad 13 and the coating or buffer 14 is coated with a thin, e.g. 10–20 micron thickness, secondary compliant buffer 15 and which is composed of the same material as the outer fiber jacket 16. The thin buffer 15 is made of a resilient yet flexible material such as a fluroplastic while silicone, acrylic and urethane materials are also deemed suitable for the purpose. The thin buffer 15 protects buffer 14 and acts to prevent the transfer of stress between the basic optical fiber unit and the electrical conductor thermocouple wire leads 22, 23 which stress might be created during the extrusion fabrication process or during bending or axial stress of the cable 10. The ability to bend the otherwise fragile core 12 is thus achieved.

The pair of thermocouple wire leads 22, 23 are laid in a parallel fashion against and outside the buffer 15. The final jacket 16 is extruded over the basic optical fiber unit, buffer 15 and the insulated electrical conductor thermocouple wire leads 22, 23 causing the leads 22, 23 to be encased within the outer fiber jacket 16. The optical fiber jacket 16 is made of a compliant, resilient and flexible material such as a fluroplastic, a silicone, an acrylic or a urethane. Jacket 16 serves to protect the optical fiber core 12 from damage caused by normal i.e. perpendicular, tangential or axial assault. The jacket 16 also serves to encase the thermocouple wire leads 22, 23 as illustrated and includes an additive or pigment such as carbon black to reduce the level of nuisance light. An overall microsize diameter of 1000 microns or less is preserved as the preferred overall cable diameter.

Each electrical conductor thermocouple wire lead 22, 23 includes an insulation 18 which is composed of a plastic material of high enough temperature stability to withstand the temperatures developed in the cable assembly during extrusion, resilient enough to protect the underlying wire conductor and to be sufficiently flexible to the extent required. The preferred material is a fluroplastic such as a Teflon derivative though other thermal resistive materials may suffice. The thermocouple wire leads 22, 23 comprise thermocouple leads with thermocouple properties. Lead 22 might for example comprise a positive thermocouple lead of a chromel composition with the bare lead being of 0.05 millimeter in diameter and lead 23 might comprise a negative thermocouple lead of a alumnel composition and of similar size.

It is appreciated that placement of the thermocouple leads 22, 23 within the optical fiber casing material 16 will alter the direction of flexure and the flexibility of the optical fiber cable 10. It has been found that when the cross sectional diameter of the insulated thermocouple leads are about 1/5th of the cross sectional diameter of the optical fiber core/clad, no practical difference in flexure direction nor flexibility was evident between configurations whereby the thermocouple leads are positioned parallel to or helically wound about the optal fiber core/clad assembly. However, it has also been found that helical placement of the thermocouple leads about the optical fiber core/clad assembly as later described in reference to FIGS. 3 and 4 is preferable to prevent directional dependent flexure of the optical fiber cable particularly when the cross sectional diameter of the insulated thermocouple leads is greater than 1/5th of the cross sectional diameter of the optical fiber core/clad.

Figure 2:
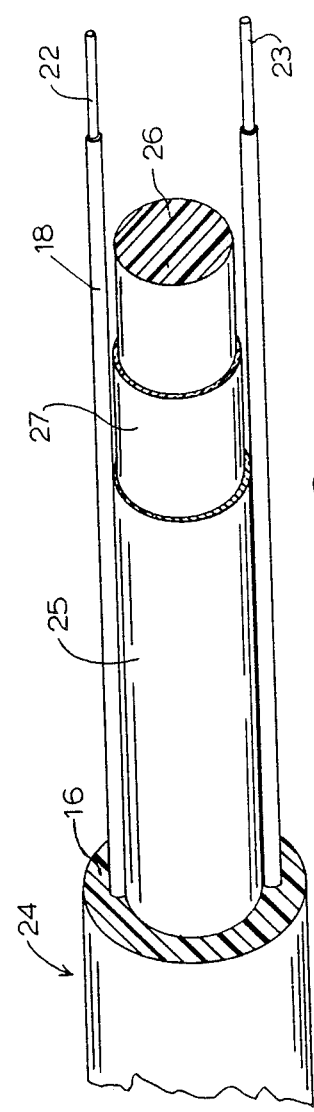
FIG. 2 is a perspective view of a composite optical fiber and thermocouple lead cable according to a second embodiment.

Making reference next to FIG. 2 and the second embodiment, composite cable 24, the leads 22, 23 assume the same relationship with respect to the basic optical fiber unit as in the first embodiment cable 10. The second embodiment composite cable 24 is primarily intended for use when there is a need for a relatively large diameter, i.e. greater than 300 microns, high grade quartz core fiber 26. The diameter of the fiber core 26 in this second embodiment is large enough to eliminate the need for a doped quartz clad although it is contemplated that the clad may be used when required for the particular application.

The doped clad 13 referred to in FIG. 1 is replaced in the second embodiment cable 24 by a thin, e.g. 15 micron thickness, optical, hard, buffer 27 which combines the function of the doped quartz clad 13 and the hard coating 14 of FIG. 1. The combination hard clad/buffer 27 of FIG. 2 is selected with an optical quality offering structural support and a protective barrier for the fiber core 26 and the desired optical influence with a high density plastic such as an acrylic derivative being suitable for the purpose. To continue the description of the second embodiment of FIG. 2, the hard clad/buffer 27 receives a thin buffer 25 comparable to the buffer 15 of FIG. 1 and is encased by the jacket 26 of a composition like that of jacket 16 (FIG. 1) of the first embodiment and as previously described in connection with the first embodiment. In an angioplasty procedure using a heated probe, the size of the core 26 and the thickness of the buffer 27 will vary according to the size of the probe.

Figure 3:
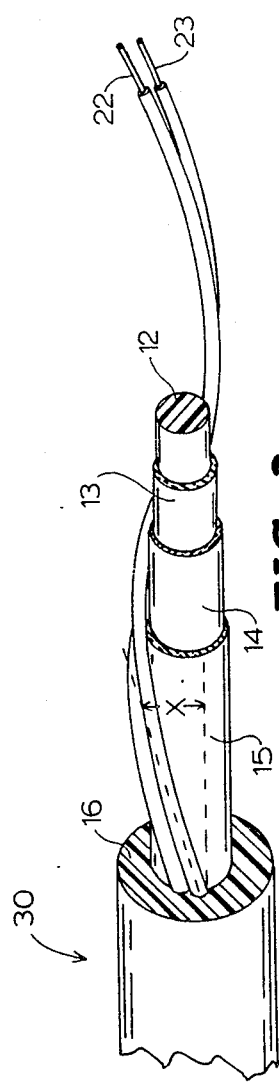
FIG. 3 is a composite optical fiber and thermocouple lead cable according to a third embodiment.
Figure 4:
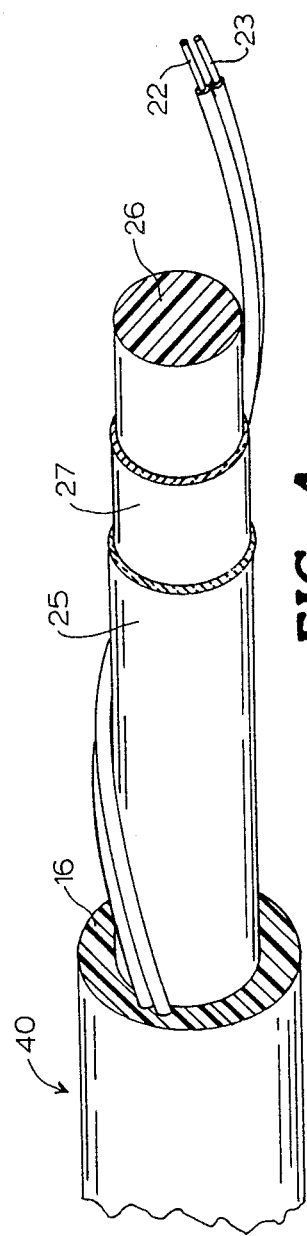
FIG. 4 is a composite optical fiber and thermocouple lead cable according to a fourth embodiment.

The third embodiment composite cable 30 illustrated in FIG. 3 except for placement of the leads 22, 23 is of similiar construction to the first embodiment of FIG. 1. The same numerical notations for the same elements of the invention as employed in FIG. 1 are also employed in FIG. 3 for reference. However, it will be particularly noticed in the composite cable 30 of FIG. 3 that the pair of thermocouple leads 22, 23 are helically wound about the thin buffer layer 15. A loose helix, i.e. a small pitch angle, is desirable to minimize the change in the optical fiber bending characteristic. The preferred pitch angle X (FIG. 3) is preferably within the range of 4 to 5 degrees though slightly higher or lower angles may be employed for specific applications.

The helical winding of the thermocouple wire leads 22, 23 tends to minimize the directional dependent flexure and protects against possible perturbations in the signal carried by the encased leads 22, 23 such as might be caused by electrical or magnetic fields in the vicinity of the optical fiber cable. The thermocouple wire leads 22, 23 are also illustrated as lying side by side in the spiral configuration. They may be offset about the axis of the optical fiber with no change in function. Leads 22, 23 should not however be overlapping since it has been observed that overlapping of the wires creates a focal point of stress which could be transmitted to the optical fiber element during the fabrication and jacket extrusion process or during bending or axial stressing. Overlapping would also tend to increase the effective outside diameter of the optical fiber cable and thus create non-uniformities in the jacket coating in the nature of bumps or ridges.

In a fourth embodiment, there is illustrated a composite cable 40 having a basic optical fiber unit similar to the second embodiment of FIG. 2. Thus, the elements of FIG. 4 bear the same numerical notations as those of FIG. 2 but with leads 22, 23 being helically wound in the manner previously explained in connection with the third embodiment of FIG. 3.

The composite microsize optical fiber electrical conductor cable of the invention lends itself to many applications. However, an application to which the invention cable has been found to be particular suited is in association with a laser heated vascular probe and a laser power and temperature control system such as schematically illustrated in FIGS. 5 and 6 and more specifically explained in co-pending application Ser. No. 180,188.

There is schematically represented in FIG. 6 a system in which the microsize composite cable 50 of the invention is shown connected at one end to a laser/power source and temperature control 52 and at the opposite end the invention cable 50 mounts a metal probe 60 such as illustrated in FIG. 5. In this application, the previously described pair of electrical conductors are assumed to represent a pair of thermocouple wires 62, 64 joined at a junction 66 to form a thermocouple T. The previously referred to fiber core such as core 12 of FIG. 1 abuts a graphite cylinder 68 mounted in the spherical metal tip 60 having a neck 74 the bore of which receives the invention cable 50 with the distal ends of the pair of conductors 52, 54 and which is filled with a suitable heat resistent material, not shown, as more fully explained in the previously identified co-pending patent application Ser. No. 180,188.

In use, the composite invention cable 50 may be of any of the forms shown in FIGS. 1–4 or as shown in the referred to co-pending application Ser. No. 180,188 and may be introduced into a vessel for a laser angioplasty procedure. The laser energy transmitted through the optical fiber element of cable 50 thus heats the graphite cylinder 68 and probe 60 providing heat for the procedure as explained in the co-pending application. The probe temperature is detected by the thermocouple T and both laser power and temperature are controlled as more fully explained particularly in the co-pending application Ser. No. 180,188. Thus, the invention enables precise temperature and power control to be achieved and eliminates the need for utilizing a separate cable for containing the sensing leads as in the prior art while preserving the desired microsize and flexibility necessary for angioplasty and similar procedures.

What is claimed is:

1. A composite microsize optical fiber-thermocouple lead cable for transmitting heat producing radiation to an operative site in a human body cavity as in an arterial or venous channel into which the cable is fed and transmitting from the same site electrical signals indicative of the site temperature, and cable comprising:
    (a) a microsize flexible optical fiber having a diameter of substantially 600 microns or less and having a first substantially thin buffer coating providing a bendable mechanical support and protective barrier for the fiber, said fiber establishing an optical path extending for the length of the cable, said optical fiber including said coating having a temperature rating accomodating the temperature generated during fabrication and use thereof;
    (b) a pair of microsize flexible electrical conductors, each conductor being formed of a material having a thermocouple property and each being of a diameter not exceeding one-tenth (0.1) millimeter and each being separately encased within a protective casing of electrically insulating material and assembled with said optical fiber so as to overlie said buffer coating and extend in a non-overlapping relation for the length of the cable and providing electrical thermocouple signal paths extending alongside and between the ends of the optical path established by said fiber; and
    (c) a light shielding flexible casing material extruded over said first buffer coating, optical fiber and encased conductors surrounding and substantially fixedly positioning said optical fiber and conductors with respect to each other within an outer jacket formed by said casing material and extending for the length of the cable, said casing material forming an overall microsize cable of substantially circular cross-section and of an overall outside diameter of substantially 1000 microns or less suited for insertion in and bending without substantial directional preference to accommodate a vessel of changing curvature within the body for an angioplasty procedure or the like.

2. A composite microsize optical fiber-thermocouple lead cable as claimed in claim 1 wherein said encased conductors comprise a pair of encased thermocouple leads suited when stripped of their casing to being joined at one end of said cable to form a thermocouple junction and to provide said electrical paths for sensing the temperature indicated by said junction and transmitting appropriate signals to the opposite end of said cable.

3. A composite microsize optical fiber-thermocouple lead cable as claimed in claim 1 wherein said encased conductors are substantially parallel for the entire length of said cable.

4. A composite microsize optical fiber-thermocouple lead cable as claimed in claim 1 wherein said encased conductors are positioned within said light shielding casing material so as to be substantially parallel and form a helix around said optical fiber for substantially the length of said cable.

5. A composite microsize optical fiber-thermocouple lead cable as claimed in claim 1 wherein said encased conductors are positioned within said light shielding casing material so as to be substantially parallel and reside on opposite sides of said optical fiber for the length of said cable.

6. A composite microsize optical fiber-thermocouple lead cable as claimed in claim 1 wherein said encased conductors are positioned within said light shielding casing material so as to be substantially parallel and to reside side by side for the length of said cable.

7. A complete microsize optical fiber-thermocouple lead cable as claimed in claim 1 including a thin clad coating located between said optical fiber and first buffer coating and having a numerical aperture greater than that of the optical fiber.

8. A composite microsize optical fiber-thermocouple lead cable as claimed in claim 7 including a second thin buffer coating located between said first buffer coating and said clad coating.

9. A composite microsize optical fiber-thermocouple lead cable as claimed in claim 2 wherein said conductors are substantially parallel for the length of said cable.

10. A composite microsize optical fiber-thermocouple lead cable as claimed in claim 2 wherein said conductors are positioned within said light shielding casing material so as to be substantially parallel and form a helix around said optical fiber for the length of said cable.

11. A composite microsize optical fiber-thermocouple lead cable as claimed in claim 2 wherein said conductors are positioned within said light shielding casing material so as to be substantially parallel and reside on opposite sides of said optical fiber for the length of said cable.

12. A composite microsize optical fiber-thermocouple lead cable as claimed in claim 2 wherein said conductors are positioned within said light shielding casing material so as to be substantially parallel and to reside side by side for the length of said cable.

13. A composite microsize optical fiber-thermocouple lead cable as claimed in claim 2 including a thin clad coating located between said optical fiber and first buffer coating and having a numerical aperture greater than that of the optical fiber.

14. A composite microsize optical fiber-thermocouple lead cable as claimed in claim 2 including a second thin buffer coating located between said first buffer coating and said clad coating.

15. A composite microsize optical fiber-thermocouple lead cable as claimed in claim 3 including a thin clad coating located between said optical fiber and first buffer coating and having a numerical aperture greater than that of the optical fiber.

16. A composite microsize optical fiber-thermocouple lead cable as claimed in claim 3 including a second thin buffer coating located between said first buffer coating and said clad coating.

17. A composite microsize optical fiber-thermocouple lead cable as claimed in claim 4 including a thin clad coating located between said optical fiber and first buffer coating and having a numerical aperture greater than that of the optical fiber.

18. A composite microsize optical fiber-thermocouple lead cable as claimed in claim 4 including a second thin buffer coating located between said first buffer coating and said clad coating.

19. A composite microsize optical fiber-thermocouple lead cable as claimed in claim 5 including a thin clad coating located between said optical fiber and first buffer coating and having a numerical aperture greater than that of the optical fiber.

20. A composite microsize optical fiber-thermocouple lead able as claimed in claim 5 including a second thin buffer coating located between said first buffer coating and said clad coating.

21. A composite microsize optical fiber-thermocouple lead element as claimed in claim 6 including a thin clad coating located between said optical fiber and first buffer coating and having a numerical aperture greater than that of the optical fiber.

22. A composite microsize optical fiber-thermocouple lead element as claimed in claim 6 including a second thin buffer coating located between said first buffer coating and said clad coating.

23. A composite microsize optical fiber-thermocouple lead cable for transmitting heat producing radiation to an operative site in a human body cavity as in an arterial or venous channel into which the cable is fed and transmitting from the same site electrical signals indicative of the site temperature, said cable comprising:

(a) a microsize flexible optical fiber having a first substantially thin buffer coating providing a bendable mechanical support and protective barrier for the fiber, said fiber establishing an optical path extending for the length of the cable, said optical fiber including said coating having a temperature rating accommodating the temperature generated during fabrication and use thereof;

(b) a pair of microsize flexible electrical conductors, each conductor being formed of a material having a thermocouple property and each being of a diameter substantially less than the diameter of the optical fiber and each being separately encased within a protective casing of electrically insulating material and assembled with said optical fiber so as to overlie said buffer coating and extend in a non-overlapping relation for the length of the cable and providing electrical thermocouple signal paths extending alongside and between the ends of the optical path established by said fiber; and (c) a light shielding flexible casing material extruded over said first buffer coating, optical fiber and encased conductors surrounding and substantially fixedly positioning said optical fiber and conductors with respect to each other within an outer jacket formed by said casing material and extending for the length of the cable, said casing material forming an overall microsize cable of substantially circular cross-section and of an overall outside diameter suited for insertion in and bending without substantial directional preference to accommodate a vessel of changing curvature within the body for an angioplasty procedure or the like.

* * * * *

UNITED STATES PATENT AND TRADEMARK OFFICE
CERTIFICATE OF CORRECTION

PATENT NO. : 4,890,898

DATED : January 2, 1990

INVENTOR(S) : Joseph R. Bentley and Steven W. Kovalcheck

It is certified that error appears in the above-identified patent and that said Letters Patent is hereby corrected as shown below:

Column 1, line 22, correct "referene" to read --reference--.

Column 2, line 51, correct "alongsidethe" to read --alongside the--.

Column 2, line 55, correct "with" (second appearance) to read --within--.

Column 6, line 6, correct "and" to read --said--.

Column 6, line 14, correct "accomodating" to read --accommodating--.

Column 8, line 7, correct "able" to read --cable--.

Signed and Sealed this

Twenty-third Day of October, 1990

Attest:

HARRY F. MANBECK, JR.

Attesting Officer

Commissioner of Patents and Trademarks